US010914055B2

(12) United States Patent
Kovscek et al.

(10) Patent No.: US 10,914,055 B2
(45) Date of Patent: Feb. 9, 2021

(54) FLUID MONITORING SYSTEM

(71) Applicant: Mark Kovscek, Brownsville, PA (US)

(72) Inventors: Mark Kovscek, Brownsville, PA (US);
Tom Makovicka, Raleigh, NC (US);
Paul Maiste, Jupiter, FL (US)

(73) Assignee: CONSERVATION LABS, INC.,
Brownsville, PA (US)

( * ) Notice: Subject to any disclaimer, the term of this patent is extended or adjusted under 35 U.S.C. 154(b) by 0 days.

(21) Appl. No.: 15/276,496

(22) Filed: Sep. 26, 2016

(65) Prior Publication Data

US 2017/0089047 A1 Mar. 30, 2017

Related U.S. Application Data

(60) Provisional application No. 62/233,131, filed on Sep. 25, 2015.

(51) Int. Cl.
*E03B 7/07* (2006.01)
*G01M 3/24* (2006.01)
*G01F 1/66* (2006.01)

(52) U.S. Cl.
CPC .............. *E03B 7/071* (2013.01); *E03B 7/072* (2013.01); *G01F 1/663* (2013.01); *G01F 1/666* (2013.01); *G01M 3/24* (2013.01); *G01M 3/243* (2013.01); *Y02A 20/15* (2018.01); *Y10T 137/8158* (2015.04)

(58) Field of Classification Search
CPC .... G01F 1/663; G01F 1/666; Y10T 137/8158; E03B 7/071; E03B 7/072
See application file for complete search history.

(56) References Cited

U.S. PATENT DOCUMENTS

| 4,397,194 A | 8/1983 | Soltz |
| 5,349,568 A | 9/1994 | Kupperman et al. |

(Continued)

FOREIGN PATENT DOCUMENTS

| CA | 2465256 | 9/2010 |
| EP | 2100103 | 7/2008 |

OTHER PUBLICATIONS

International Search Report and Written Opinion of the International Searching Authority regarding International Application No. PCT/US2016/053791; completed Nov. 14, 2016; dated Dec. 9, 2016.

(Continued)

*Primary Examiner* — Atif H Chaudry
(74) *Attorney, Agent, or Firm* — Sean D. Flaherty; Gordon Rees Scully Mansukhani LLP

(57) ABSTRACT

A system for observing flow may comprise a device for observing flow in a pipe comprising a sound detector, a housing affixing the sound detector external to a pipe, a microprocessor, a power supply, and a device interface. The system may further comprise a data transmitter, a remote server for receiving data from one or more devices for observing flow in a pipe, a plurality of server-side applications applying analytical operations to the data, and a plurality of end-user devices for accessing the data through a plurality of user interfaces. The flow observation system can be used to detect leaks, identify water conservation opportunities, alert end-users of overconsumption, and remotely shut-off the water supply.

20 Claims, 8 Drawing Sheets

(56) References Cited

U.S. PATENT DOCUMENTS

| | | |
|---|---|---|
| 5,409,037 A | 4/1995 | Wheeler et al. |
| 5,421,211 A | 6/1995 | Heckman |
| 6,408,699 B1 | 6/2002 | Moss et al. |
| 6,510,842 B2 | 1/2003 | Ismailov |
| 6,564,649 B1 | 5/2003 | Toda |
| 6,758,100 B2 | 7/2004 | Huang |
| 7,581,453 B2 | 9/2009 | Ao et al. |
| 7,806,003 B2 | 10/2010 | Ohmuro et al. |
| 7,963,172 B2 | 6/2011 | Liu et al. |
| 8,489,342 B2 | 7/2013 | Dugger et al. |
| 8,494,932 B2 | 7/2013 | Shen |
| 2004/0123666 A1 | 7/2004 | Ao et al. |
| 2004/0128034 A1 | 7/2004 | Lenker et al. |
| 2006/0117867 A1 | 6/2006 | Froehlich et al. |
| 2006/0225514 A1* | 10/2006 | Conquergood ......... G01F 1/666 73/861 |
| 2008/0160901 A1 | 7/2008 | Stanimirovic |
| 2009/0255345 A1 | 10/2009 | Gysling |
| 2010/0192703 A1* | 8/2010 | Huang ..................... G01F 1/66 73/861.28 |
| 2010/0218618 A1 | 9/2010 | Mori et al. |
| 2010/0313958 A1* | 12/2010 | Patel ....................... E03B 7/071 137/1 |
| 2012/0103069 A1 | 5/2012 | Al-Qahtani et al. |
| 2012/0239539 A1* | 9/2012 | Shen ....................... G01F 1/666 705/34 |
| 2013/0080081 A1* | 3/2013 | Dugger ................... G01F 1/667 702/48 |
| 2013/0085688 A1* | 4/2013 | Miller ...................... G01F 1/66 702/48 |
| 2014/0069207 A1 | 3/2014 | Leaders et al. |
| 2014/0260667 A1* | 9/2014 | Berkcan .................. G01F 1/66 73/861.28 |
| 2014/0366612 A1* | 12/2014 | Horne ...................... G01F 1/66 73/40.5 A |
| 2016/0161310 A1* | 6/2016 | Leaders .................. G01F 1/663 702/48 |
| 2016/0363471 A1 | 12/2016 | Olivier et al. |

OTHER PUBLICATIONS

PCT International Application Publication No. WO 2013/164805 A1 of International Application No. PCT/IB2013/053606, published Nov. 7, 2013; pp. 1-99.

* cited by examiner

Baseline Regression for Development Model

The Development Model includes 27 measurements for frequencies from 25Hz to 10kHz; these variables are the independent variables in the regression to estimate water flow. The algorithm can be determined from the table below using the Coefficients column (Water Flow = 4.996 − 0.270*F25 +

Model Outcomes for Baseline

The following table provides the regression statistics and analysis of variance. The baseline model was built with 3,164 observations with an additional 3,164 observations used as a holdout sample for residual analysis.

| Regression Statistics | | | | | |
|---|---|---|---|---|---|
| R | 0.9288 | | | | |
| R Square | 0.8626 | | | | |
| Adjusted R Square | 0.8613 | | | | |
| S | 0.9003 | | | | |
| Total number of observations | 3,164 | | | | |

| ANOVA | | | | | |
|---|---|---|---|---|---|
| | d.f. | SS | MS | F | p-level |
| Regression | 29 | 15,946.57 | 549.88 | 678.49 | 0.E+0 |
| Residual | 3,134 | 2,539.96 | 0.81 | | |
| Total | 3,163 | 18,486.53 | | | |

FIG. 13

FLUID MONITORING SYSTEM

CROSS REFERENCE TO RELATED APPLICATIONS

This application claims the benefit of U.S. Provisional Patent Application Ser. No. 62/233,131 which was filed on Sep. 25, 2015. The aforementioned application is expressly incorporated herein by reference.

FIELD

The present disclosure relates generally to fluid flow monitoring systems and more specifically, to connected systems for acoustically observing water flow within a pipe or a network of pipes. The disclosure also relates to detecting leaks in a plumbing system, applying analytical methods to observed data, identifying consumption and water uses, as well as conservation opportunities.

BACKGROUND

Commercial and residential plumbing is often located in difficult-to-see and difficult-to-reach locations. Plumbing may be between walls, underground (including sprinklers), or beneath a structure. Often times, the pipes within a plumbing system may develop a leak and the leak may go undetected for long periods of times, whether it be from the modest size of the leak (e.g. toilets and faucets), or because the leak is located in a location that a user rarely or never encounters (e.g. sprinklers). Leaky plumbing wastes natural resources and imposes unnecessary costs on the user. Additionally, leaky plumbing can result in structural property damage and hazardous biological growth. Lastly, municipalities and water authorities often require meters to be placed underground and/or external to the home making it more difficult for consumers to monitor water flow and identify or test for leaks.

In residential settings, users may encounter their water bill and face a quandary when they cannot locate the leak. Moreover, users are often times unsure whether the increased water usage is the result of a bona fide leak or whether the increase represents an accurate reflection of the user's increase in water use. At best, a user does not become aware of a potential problem until the end of their statement cycle, which may be at the end of a month, or an even longer period. At worst, a leak may go undetected until damage results, because a user believes the usage is normal.

In commercial settings, users may never detect a small leak if, for example, the aggregate use for a larger commercial building is sufficiently large that small fluctuations would not merit alarm.

Water delivery authorities rarely, if ever raise the issue of a leak, because they may be compensated for a user's increased usage. Thus, lacking the incentive to discover and diagnose leaky plumbing, the burden falls on the user/ratepayer, or another interest holder, such as an insurance company, which may be responsible for paying for damage incurred as a result of the undetected leak.

Conventional devices and methods for detecting leaks may include the visual examination of unions known for leaks such as hot water heaters, toilets, bibs, welds, turns, or valves. Additionally, a user may employ the use of a moisture meter in suspected locations, or a user may conduct a trial-and-error process where valves are opened and closed starting from the furthest point "down" the line and working one's way "up" the line until the user believes they have isolated the branch of plumbing where the leak begins.

Beyond broken or leaky pipes, individual plumbing fixtures may leak or operate inefficiently as compared to other available alternatives. However, users typically have no concept of the water volume used by any particular fixture. This is because, for most end-users, physical flow meters are only located at one "upstream" location, which monitors aggregate water usage. Conventional water meters do little if anything to provide real-time or location specific flow rate data.

Attempts have been made to quantify flow at particular locations within plumbing system. Such devices typically take the form of an apparatus which must be placed in-line with the plumbing system. Such in-line applications often require manual calibration, and further may require adapters. Conventional flow rate measuring devices often have an analog or digital display which displays data only at the specific location of the device. Such conventional flow rate devices suffer from the limitation that they require invasive modification to a plumbing system, or if placed at the user-end of a system, interfere with the operation of a fixture and make for an unattractive appearance. In-line devices can also create additional opportunities for unwanted backups, clogs, and pressure losses.

Remote monitoring efforts, such as the use of ultrasonic sensors, have been made for observing fluid flow, but ultrasonic sensors tend be bulky, expensive, and may require significant training to operate. Additionally, this type of monitoring is sporadically used and does not offer long-term, real-time monitoring. Lastly, due to the cost and difficulty in operating, this type of monitoring is generally used for industrial applications.

Accordingly, there is a need for a low cost, easy-to-use, non-invasive device, system, and method for observing real-time fluid flow within a plumbing system, collecting and interpreting data from the fluid flow observation method and device, and monitoring and analyzing the fluid-flow in an un-burdensome manner.

SUMMARY

The following simplified summary is provided as a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect, the fluid flow monitoring system comprises a network-connected pipe flow monitoring device, remote applications and infrastructure, and a user portal. The system may also employ a plurality of flow monitoring devices. The network may be a private network, or may be a public network, such as the internet. The applications may be hosted remotely to the flow monitoring device, such as on a computer within a private network, or for example, on a remote server accessed through a general internet connection. In one embodiment, the plurality of flow monitoring devices can be at one location. In another embodiment, the plurality of flow monitoring devices can be at different locations. The system may further comprise a plurality of user portals, wherein some portals are consumer portals and some are municipal water utility portals. In one embodiment, the plurality of user portals can be accessed at one location. In another embodiment, the plurality of user portals can be accessed at different locations.

In another aspect, the fluid flow monitoring system comprises a sound detector and housing for the sound detector, a signal processor, a microprocessor, a power supply, and a device interface. The signal processor may optionally be separate from the microprocessor, or the microprocessor may comprise a signal processor. The fluid flow monitoring system may further comprise a data transmission means, such as a wireless antenna or a data port. The fluid flow monitoring system may further comprise one or more remote applications, a plurality of user interfaces, and a notification system.

In one aspect, the fluid flow monitoring device comprises an audible sound detector. The audible sound detector may take the form acoustic-to-electric microphone or other sensors. Acoustic-to-electric microphones are well-adapted to the present invention because they are relatively inexpensive, and obviate the need for the implementation of more-expensive remote sensing technology such as ultrasonic sensors. Although the foregoing audible sound detector will be referred to generally as a microphone throughout the remainder of the disclosure, it should be noted that alternative devices or methods capable of sensing sound volumes (decibel or sound pressure level) and frequencies in the audible range may be eligible alternatives. In one embodiment, the frequencies are in the 12 hertz (Hz) to 20,000 Hz range. In another embodiment the frequencies are in the 25 Hz to 10,000 Hz range.

In one aspect, the microphone is mounted or integrated into a frame or housing, which non-invasively attaches to the exterior of a plumbing fixture, such as a pipe. The microphone is oriented within the housing to detect sound characteristics, such as amplitude or loudness or frequency or all. In one embodiment, the amplitude or loudness can be detected across various sound frequencies. In another embodiment, the loudness is decibel based. In another embodiment, the loudness is sound pressure level based. The microphone housing may include or be made of sound blocking material and sound absorbing material, either, or both. The sound blocking and/or sound absorbing material is strategically placed within the housing to amplify desired sound characteristics for the microphone to sense it, and alternatively deaden certain undesired sound characteristics to avoid the microphone from sensing them, as the case may be.

In one aspect, a signal processor is connected to the microphone to process the signals created by the microphone. The signal processor may include one or more signal filters, which are capable of removing unwanted electronic signals from further transmission while further permitting the passage of other electronic signals. In one embodiment, the signal processor converts analog signals to digital signals. The signal processor may be preferably integrated into the microphone housing.

In one aspect, a microprocessor is connected to the signal processor. The microprocessor may preferably organize and process the sound signals into computer-readable data. The microprocessor may be instructed to apply a scoring algorithm and/or categorization algorithms or rules to the data created from the signal processor. The microprocessor may be preferably integrated into the microphone housing.

In one aspect, the microprocessor and signal processor may be a single piece of hardware which serves both purposes of filtering and transmitting electronic signals and translating electronic signals to computer readable data, as well as applying algorithmic formulae and categorization rules to the data. According to this aspect, the signal processor may be integrated into the microprocessor, or the microprocessor may additionally carry out the tasks of the signal processor, obviating the need for a separate signal processor.

In one aspect, the flow monitoring device has a power supply. Said power supply can be powered from a battery, or can be connected to the electrical system of a structure, such as a residence. Alternatively, the power supply may take the form of a solar based power source such as a solar panel or array connected to a power storage device, such as a battery or a plurality of cells.

In one aspect, the flow monitoring device may have a device interface. The device interface may display or exhibit a plurality of statuses to the user as instructed by the microprocessor. For example, the device interface may be a series of lights, each one of which illuminates to reflect the then-current status of the flow monitoring device. For example, the microprocessor may instruct a red light on the device interface to illuminate during a severely low or high flow situation. Additionally, the device interface may have other indicator lights, the illumination of which may be adjusted or set by a user. For example, the user may set the flow monitoring device to have one status indicator illuminate when flows are observed between the range of X and Y, and may thereafter cause a second status indicator illuminate when the flow is between Y and Z, where Z may be greater Y, thus indicating an above-normal flow. As another example, (the inverse) the user interface of the flow monitoring device may be programmed to have both status lights illuminate when flow is between X and Y, and only have one status light illuminate when the flow is between W and X, where W is less than X, thus indicating a below-normal flow. The device interface may optionally include a power or battery indicator which allows a user to identify whether power is coming from a battery or a main electricity. In the case of a battery, the power indicator may notify the user how much charge remains in a battery. The device interface may also have a wireless status indicator. Said wireless status indicator may indicate the status of the flow monitoring devices' connectedness to a wireless data connection. The device interface may take the form of a plurality of lights, such as light emitting diodes (LED), or the device interface may take the form of a liquid crystal display (LCD), organic light emitting diode (OLED), or other type of computerized display. The device interface may also comprise an alarm. The alarm may sound when any predetermined criteria is met, such as the detection of a leak, pipe burst, no-flow circumstance, low-battery or power disconnect, loss of data transmission, or other malfunction. The alarm may comprise a speaker, and the alarm may emit audible messages spoken in the language of the user. The device interface may also include a button or switch. In one embodiment, the button or switch can be used to reset, test, or calibrate the device interface, such as the indicator lights, or alarm, or both. In another embodiment, the button or switch is to turn the device on or off.

In one aspect, the data transmission means of the flow monitoring device comprises an antenna capable of receiving or transmitting data over a network. The antenna may be connected to a wireless chip that handles the data received or transmitted by the wireless antenna. Collectively, the connected wireless antenna and chip components may be referred to as the wireless assembly. The wireless assembly may be capable of operating on a personal area network (e.g. Bluetooth), local area network (e.g. Wi-Fi), wide area network, or cellular network. The wireless antenna is not restricted to the transmission technologies recited herein and may comprise any technology which transmits information wirelessly, via a communication channel, such as radio frequency (RF) or microwave transmission, and may include other technologies such as satellites.

In one aspect, the flow monitoring device comprises a data port. The data port may be a universal serial bus (USB) port. The data port may optionally be another type of data port, such as a Thunderbolt port, a Lightning port, Ethernet port, or a proprietary port of a different type. The data port allows a user to attach peripherals to the flow monitoring system. For example, a user may attach a computer to the flow monitoring device via the data port. The device may transmit data to the computer regarding the operation of the microphone transducer. Additionally, a user may use the port to calibrate, set, or maintain the performance and data monitoring settings and characteristics of the device. For example, the data port may be used by a user to program the behavior of the device interface, such as the lights or alarm.

In one aspect, the data transmission means of the flow monitoring device comprises a wired network cable. The network cable may be hard-wired to the flow monitoring device as a primary means of data transmission, or as a back-up redundancy. The use of the network cable may also be needed for maintenance or diagnostics by a user or service technician. The network cable may comprise any technology for transmitting data through a wire, including but not limited to Ethernet cables, universal serial bus (USB) cables, coaxial cables, or other fiber optic cables.

In one aspect, the flow monitoring device comprises a base to which the data is sent wirelessly. The base may be referred to as a base or a base station. The base is internet-connected and physically located remotely relative to the flow monitoring device. The base may comprise a generic Wi-Fi router or internet gateway. Alternatively, the base may comprise a proprietary base station which is connected to a Wi-Fi router or a hard-wired internet connection. The base may also be a cellular connection, such as a hot spot. The base is capable of simultaneously communicating with a plurality of flow monitoring devices. Thus, the base serves as a hub for the data transmitted among the plurality of flow monitoring devices. The base transmits data to a server via the internet. In one embodiment, the server can include infrastructure and applications to support the disclosed system and may be referred to as a server-side application.

In one embodiment, the flow monitoring device is connected to a water shutoff device, wherein upon the detection of a predetermined threshold (eg., an emergency event), the flow monitoring device instructs the water shutoff device to close a valve and prevent water from further entering the plumbing network downstream of the shutoff device.

According to an aspect, the flow monitoring system comprises a local application loaded on to a computer-readable storage medium on the flow-monitoring device. The local application may have data management capabilities that, in conjunction with the computer-readable storage medium, can store, organize, and process the data gathered by the microphone and scored by the signal processor and/or microprocessor. The data management system of the local application may apply one or more algorithms or categorization rules to interpret or categorize the data. The local application may then cause the device interface to exhibit one or more particular notifications upon the happening of a predetermined event, whether through the exhibition of a status indicator light, the manipulation of a display, or the sounding of an alert.

In one aspect, the flow monitoring system comprises remote applications and backend infrastructure running on a computer-readable storage medium. The backend infrastructure has data management capabilities and in conjunction with computer-readable storage medium, can preferably store, organize, and process the data transmitted to it from the flow monitoring device via the internet. The data management capabilities of the backend infrastructure and remote applications may carry out the foregoing tasks regardless of connectivity method with the flow monitoring device, whether via Bluetooth, internet, cellular, near-field communication, microwave, satellite, television signal white space, or otherwise. The data management system for the remote applications may apply one or more algorithms or categorization rules to interpret and categorize the data. The data management system may support a flow prediction improvement engine, wherein the application periodically updates and changes the algorithms applied to the data so as to increase the level of predictability and confidence, while filtering outlying data. The data management system may conduct a plurality of analyses, including time-sensitive flow calculations and conservation routines. In another embodiment, the remote applications simply allows the various processes to "speak to each other".

In one embodiment, the remote applications and backend infrastructure are connected to a water shutoff device, wherein upon the detection of a predetermined threshold (e.g., an emergency event), the remote applications and backend infrastructure instruct the water shutoff device to close a valve and prevent water from further entering the plumbing network downstream of the shutoff device.

In one aspect, the backend infrastructure enables one or more user portals through server-side and client-side applications. The user portals further comprise a user interface displayed on an electronic display. A user may access the user portal over the internet by logging into a website, using desktop application, or by using a mobile application. The one or more user portals may employ a plurality of portal categories. For example, one user portal may be for a municipal water utility to log in and access a municipal water customer's observed data. The utility user portal may optionally observe aggregate data collected by a plurality of customers. By way of another example, another user portal may be for a customer, wherein the customer may access and observe the data from its system, but is prohibited from observing the data or aggregate data of systems belonging to other customers. In another embodiment, a customer can compare its personal data to anonymously compiled data from other users. In another embodiment, a customer can compare its personal data to data compiled from a specific cohort. The cohort may be based on geography, household size, company size, or all other persons using the flow monitoring device.

In one aspect, the user portal comprises a plurality of options for system configuration, data observation, system warnings, and system recommendations. The system configuration options allow a user to input additional characteristics applicable to specified data. For example, a user can monitor a single pipe at the point of entry, e.g. at the meter, of a single location. Alternatively, a user can monitor multiple pipes at a single location. For example, if a user knows that one dataset is coming from a flow monitoring device located on a pipe in a residential kitchen, then the user may use the user portal to name the device and may instruct the server-side application to apply analyses germane to plumbing flow characteristics often found in kitchens. Employing such location and application-focused algorithms and analyses allows a user to quantify their data relative to other locations and applications. By way of another example, if the user knows another dataset is coming from a flow monitoring device placed on its irrigation system, the user could log in through the user portal and configure the device to apply appropriate algorithms and analyses to this dataset with would be more appropriate for irrigation plumbing. In the event a user's system comprises a plurality of monitoring devices, the portal may optionally allow a user to develop or observe a map, or branching tree, of its system. Thus a user may be able to quantify the volume of water used in respective branches of its system. If, for example, the sum of branch-observed flows is less than the aggregate-observed upstream flow, such may indicate the existence of a leak. In another aspect, the system can be configured to identify the characteristics of the location such as the size, number of users, number of water using appliances (e.g. toilets, sinks, showers, tubs, dishwasher, washing machines, heating and cooling units, etc.).

Once configured, the device and backend system, may identify such a discrepancy, and deliver a notification to the user via the user portal. The user portal may also comprise a notification system. The user may log into the user portal and specify certain events which would trigger a notification. Such notifications could reflect positive or negative data benchmarks. For example, if a user's system includes data from a flow monitoring device located on a residential plumbing system a user may instruct the user portal to issue a positive notification every time it detects a shower lasting less than a specified period of time (say for example, 7 minutes), or using a volume of water less than a specified volume. So as to avoid false notifications, the user portal may be set to withhold notifications unless data reflects flow lasting at least a specified period of time (say 2 for example, 2 minutes). The notification system may alternatively be configured through the user portal to issue negative notifications, or warnings. For example, the notification system may be configured to issue a warning notification when the data observes slow, but constant flow, indicating a slow leak. Alternatively, the notification system may be configured to issue a warning when flows within a system are observed as extremely volatile, indicating a failing component, such as a pressure regulator. The notification system may be configured to issue a warning when a particular branch within a system observes prolonged periods of high flow, indicating that a fixture has been left in the open position, or that there is a substantial plumbing rupture.

In one aspect, the notification system may be accessible by both a customer and a municipal water utility. The notification system may be set differentially, such that certain notification events notify a user, whereas other notification events notify the utility. For example, if a plurality of customer monitors reflect normal flow at a certain point, but low or no flow universally thereafter (later in a branch, or "downstream"), such would reflect the potential for a water main line obstruction or break at a location in between the high and low pressure zones. Thus, while the notification system may notify a customer simply that their municipal water service has been interrupted, it may also notify the utility with more specific information about the potential zone of obstruction.

In one aspect, the notification system can provide information to the customer and utility about water usage for a variety of different situations. For example, the information can be provided as a daily, weekly, or monthly reports on water usage. Alternatively, the information can be provided based on the time of day and water appliance. The information can provide the customer valuable insights as to its water usage. The information can also provide analyses of the water usage that may reveal areas where water usage can be reduced.

In one aspect, the notification system may alert the user of overconsumption and the potential for costs incurred with overconsumption. Some climates may be subject to drought conditions such that governmental entities institute mandatory usage reductions or water rationing schemes. Users unable to meet the mandatory reductions may face significant penalties. Users unable to operate within the rationing criteria may experience water outages. Thus, the notification system can be configured to provide continuous or intermittent status updates informing a user that their water usage conforms to reduction mandates or rationing criteria. Alternatively, the notification system may notify a user that their water volume usage deviates from said reduction or rationing criteria and will project the likely surcharge consequences (in the case of mandated reductions) or the date of expected water outage (in the case of water rationing).

In one aspect, the notification system may alert users through a plurality of media or data transmission modes. For example, the notification system may notify a user of a particular monitoring device's status, or in the case that a plurality of monitoring devices are deployed, the notification system may notify a user of the overall status of larger system characteristics via email, text messaging, or automated telephone dialing. A user may configure their preferred mode or modes of notification through the interface of the user portal.

With respect to the present disclosure, a method for observing pipe flow is provided. The method comprises a step of placing a flow monitoring device on the exterior of a pipe, wherein the flow monitoring device includes an audible sound detector, a microprocessor, a data transmitter, a power supply, and a device interface; a step of measuring audible sound through the pipe with the flow monitoring device; a step of processing the sound to computer readable data through a microprocessor; a step of the microprocessor applying one or more algorithms to the computer-readable data, and a step of exhibiting the resultant data on the device interface. In one embodiment, the exhibited data may indicate water flow status. In another embodiment, the exhibited data may indicate an alert. In another embodiment, the displayed data may indicate a leak. In another embodiment, the displayed data may indicate a broken pipe. In another embodiment, the displayed data may indicate ways to conserve water usage.

In one aspect, the method disclosed herein may comprise a step of placing a flow monitoring device on the exterior of a pipe, wherein the flow monitoring device includes an audible sound detector, a microprocessor, a data transmitter, and a power supply; a step of measuring audible sound through the pipe with the flow monitoring device; a step of processing the sound to computer readable data through a microprocessor; a step of transmitting the computer readable data to a remote server having a storage medium holding a server-side application; a step of applying one or more algorithms on the device or supplied by the server side application to the computer readable data, a step of making the resultant data, analysis, usage and notifications available to a user via a user portal.

In one aspect, the method for monitoring pipe flow may comprise the foregoing steps, wherein the flow monitoring device further comprises a signal processor. The signal processor may interpret acoustic signals and convert them to digital signals. The signal processor may apply one or more filters to the acoustic signals to enhance the signals desired to be observed, and to eliminate those signals where observation is either unneeded or undesired. The signal processor may be separate from, or integrated within the microprocessor. The microprocessor may alternatively carry out the signal processor's tasks.

In one aspect, the method for monitoring pipe flow may comprise the foregoing steps, wherein the algorithm applied by the microprocessor of the flow monitoring device further comprises an algorithm that analyzes flow rate as a factor of time.

In one aspect, the method for monitoring pipe flow may comprise the foregoing steps, as well as a further step of connecting a plurality of flow measuring devices to the internet.

In one aspect, the method for monitoring pipe flow may comprise the foregoing steps, as well as a further step of sending one or more notifications to one or more users. The notification event may occur upon the data reflecting a specified triggering benchmark, such as high, or low flow measured as a factor of time. A notification even may also occur upon a triggering event wherein a plurality of data sets indicates a relational performance characteristic, such as disparate flow rates in different branches of the system.

In one embodiment, the method for monitoring pipe flow may further comprise a step of connecting either the flow monitoring device or the remote applications and backend infrastructure to a water shutoff device, wherein upon the detection of a predetermined threshold (eg., an emergency event), the flow monitoring device instructs the water shutoff device to close a valve and prevent water from further entering the plumbing network downstream of the shutoff device.

In one embodiment, the flow monitoring system is operated and maintained by an end user. In another embodiment, the end user subscribes or leases the flow monitoring system from a service provider.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 13 is a non-limiting example of an illustration of statistical analysis performed on data collected by an acoustic flow rate observation device.

DETAILED DESCRIPTION

The features of the present disclosure may be created by using one or more distinct parts and associated components which, when assembled and connected together form the disclosed flow monitoring system regardless of the particular form. Unless defined otherwise, all terms of art, notations and other scientific terms or terminology used herein have the same meaning as is commonly understood by one of ordinary skill in the art to which this invention belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a field technician. However, this term is not limited to end users or technicians and thus encompasses a variety of persons who can use the disclosed systems and methods.

The pipe flow monitoring device, system, and methods described herein can now be better understood turning to the following detailed description. It is to be expressly understood that the illustrated embodiments are set forth as examples and not by way of limitations on the embodiments as ultimately defined in the claims.

Figure 1:
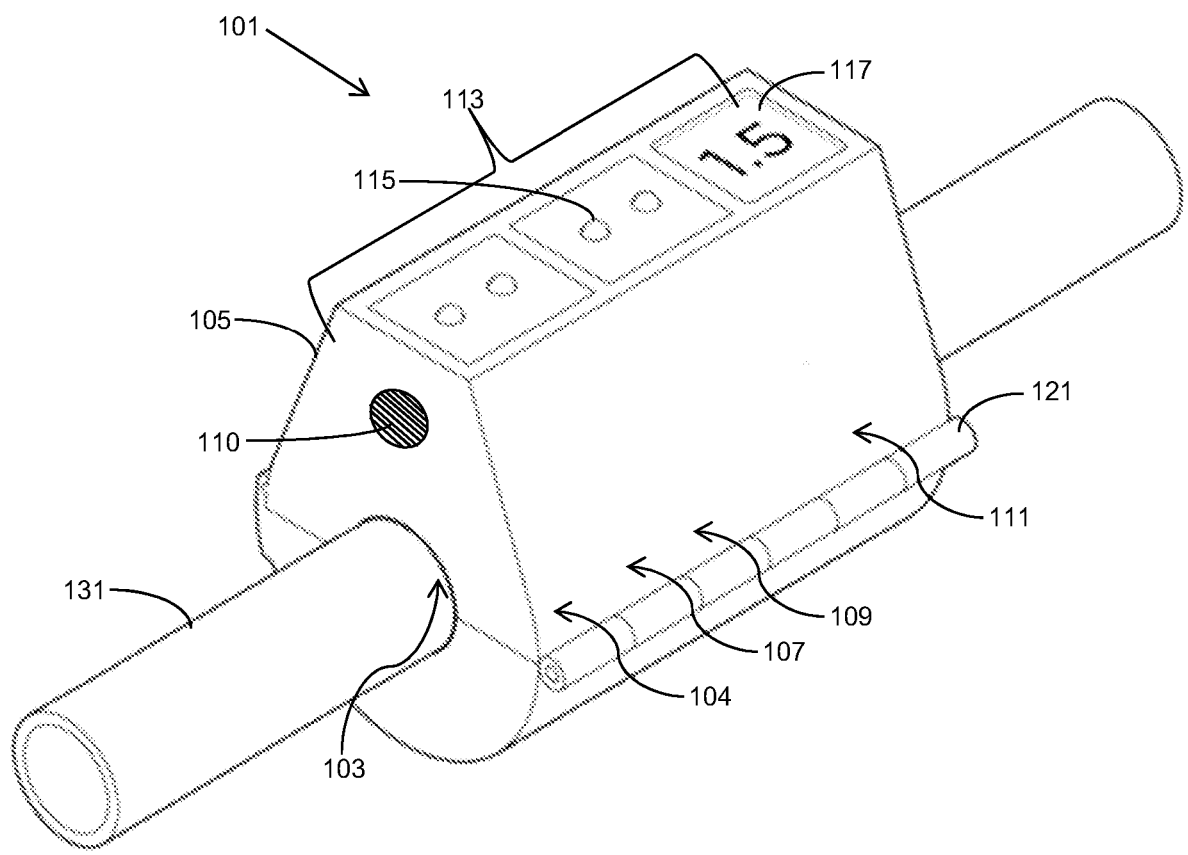
FIG. 1 is a perspective view of an embodiment of a flow monitoring device of the present disclosure, mounted to a pipe.

FIG. 1 is a perspective view of an embodiment of a flow monitoring device 101 of the present disclosure, mounted to the exterior of a pipe 131. The housing 105 of flow monitoring device 101 is visible. On the top of the housing 105, a device interface 113 is provided. In the present embodiment, device interface 113 contains both a series of lights 115 as well as a visual digital display 117. In the present embodiment, the housing 105 envelops and affixes to the exterior of the pipe 131 through the use of a hinge 121 which permits an upper and lower portion of the housing to be detachably connected to one another. Internal to the housing 105 of the flow monitoring device 101, is a sound detector (103)(not visible), sound-blocking material (not visible), sound-absorbing material (not visible) (sound-blocking and sound-absorbing material may be referred to alternatively or collectively as sound-isolating material), a power supply such as a battery (111)(not visible), a data transmitter (121)(not visible), a signal processor (107)(not visible), and a microprocessor (109)(not visible). Also mounted on the housing 105 of the flow monitoring device 101 is an alarm 110, which, in operation can emit either a siren, or pre-recorded language-driven announcement.

Figure 2:
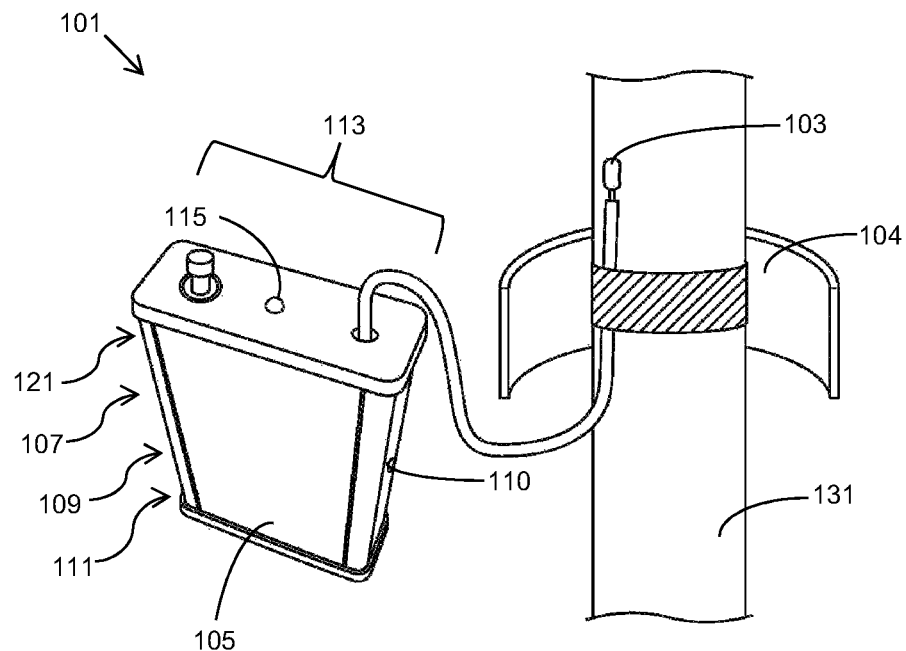
FIG. 2 is a perspective view of an alternative embodiment of a flow monitoring device of the present disclosure, with a sound isolating material exploded to reveal a sound detector connected to a housing and mounted to a pipe.
Figure 3:
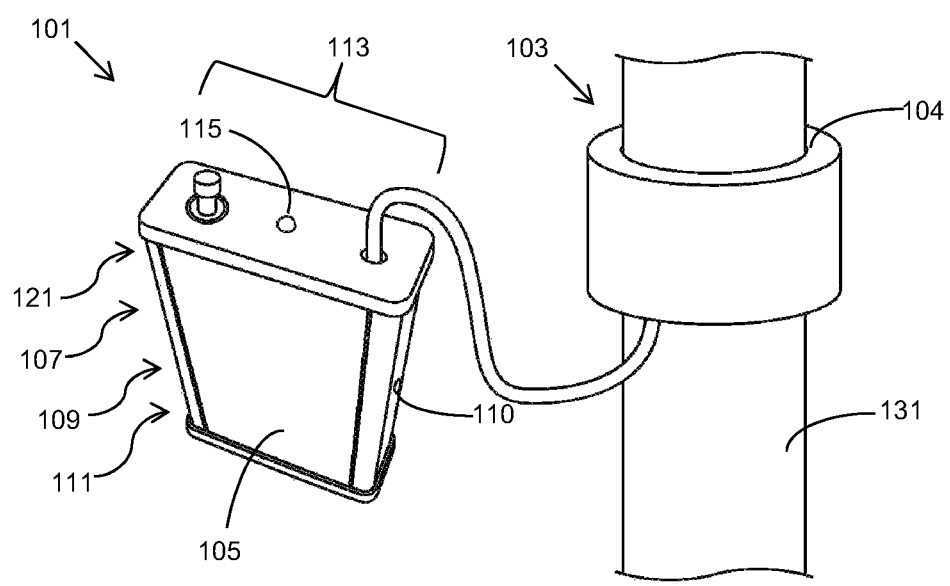
FIG. 3 is a perspective view of an alternative embodiment of a flow monitoring device of the present disclosure, with a sound isolating material enveloping a sound detector connected to a housing and mounted to a pipe.

FIG. 2 is a perspective view of an alternative embodiment of a flow monitoring device 101 of the present disclosure, with a sound isolating material 104 exploded to reveal a sound detector 103 connected to a housing 105 and mounted to a pipe. In this embodiment, the sound detector is not integrated within the housing 105, but instead is connected to the housing 105 by a wire, so that the housing may be placed at some distance from the area of the pipe 131 monitored. Such an arrangement can provide an advantage to the user where a pipe is in a hard-to-reach location, such as under a floor board or next to a wall, but still permits a the use of the present invention to observe fluid flow through the pipe 131. When prepared to observe fluid flow, the sound detector 103 is enveloped by sound isolating material 104 (As seen in FIG. 3) which can comprise of either sound blocking material, or sound absorbing material, or both. Sound isolating material 104 may be any material which lessens or prevents unwanted sounds from reaching the sound detector 103. However, in the present FIG. 2, the sound isolating material 104 is exploded to reveal the flow monitoring device 101 mounted to the pipe 131. A device interface 113 is provided on the housing 105. In the present embodiment, device interface 113 includes a light 115 and an audible alarm 110. Internal to the housing 105 of the flow monitoring device 101, is a power supply such as a battery (111)(not visible), a data transmitter (121)(not visible), a signal processor (107)(not visible), and a microprocessor (109)(not visible).

FIG. 3 is a perspective view of an alternative embodiment of a flow monitoring device 101 of the present disclosure as seen in FIG. 2, but the sound isolating material 104 is envelops the sound detector 103 connected to a housing 105 and mounted to a pipe 131. All other features are similarly shown as seen in FIG. 2.

Figure 4:
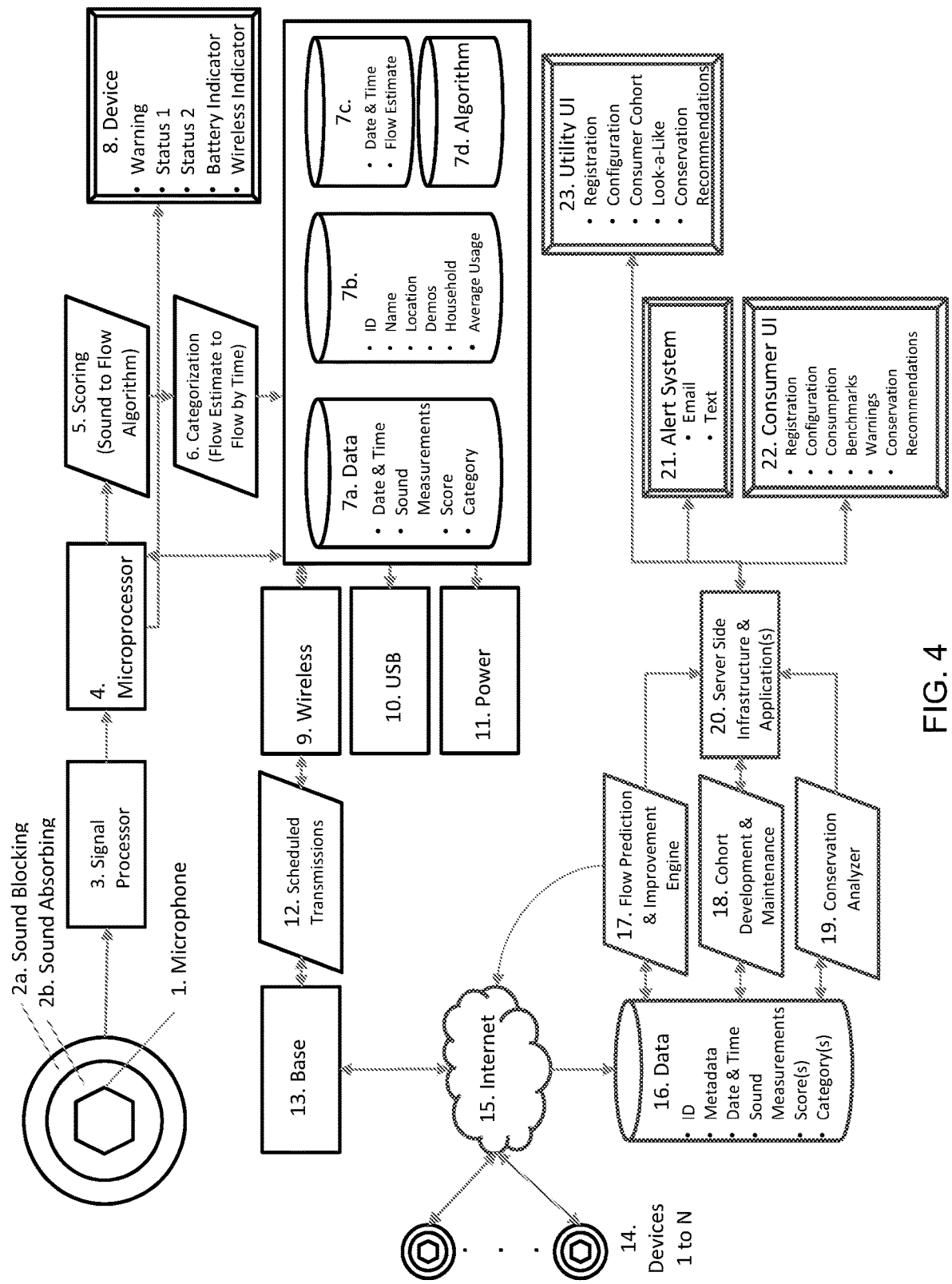
FIG. 4. is a non-limiting example of a schematic illustration of a system for monitoring fluid flow, collecting data, organizing and interpreting data, transmitting data via a transmission network, displaying the data, and alerting the user to certain data patterns, trends and benchmarks.

FIG. 4 depicts a schematic illustration of a system for monitoring fluid flow, collecting data, organizing and interpreting data, transmitting data via a transmission network, displaying the data, and alerting the user to certain data benchmarks and water consumption patterns. With respect to FIG. 4, an audible sound detector is provided as microphone 1 within the system. Microphone 1 of FIG. 4 is the same element of the present disclosure as sound detector 103 of FIGS. 1-3. The audible sound detector, e.g. microphone 1, is capable of detecting sound in the audible frequency, which is roughly 12 hertz (Hz) to 20,000 Hz. In one embodiment, the audible frequency is from 25 Hz to 10,000 Hz. Microphone 1 is represented as affixed to a water pipe (see 131 of FIGS. 1-3) by a housing (see 105 of FIGS. 1-3) which also contains sound blocking material 2a (e.g. mass loaded vinyl) and sound absorbing material 2b (e.g. melamine foam). Sound blocking material 2a and sound absorbing material 2b of the embodiment of FIG. 4 are represented as sound isolating material 104 of FIGS. 1-3 and may be generally referred to as sound-isolating material. The microphone 1 is connected to a signal processor 3 to process the audible sound signals detected by the microphone 1. The signal processor 3 may apply one or more filters to the sound signals in processing the signals into computer-readable data and sending the data to a microprocessor 4. The microprocessor 4 analyzes, organizes, and processes the data received from the signal processor 3. The microprocessor 4 has been configured to apply a particular instruction set to the data, wherein said instruction set comprises a plurality of algorithms. One algorithm applied to the data by microprocessor 4 is a scoring algorithm 5 which estimates volumetric water flow based on the sound data. The microprocessor 4 then applies a categorization algorithm 6 to the scoring data, which organizes the scoring data into a dataset organized as a function of volume over time. The microprocessor 4 then stores to a computer-readable storage medium, the observed and calculated data, e.g., flow rate data 7a, metadata 7b, and benchmarks 7c. The flow rate data 7a, as discussed above, includes information related to date, time, sound measurements collected, scoring, and categorization. Categorization includes flow-level categories (e.g., an ordinal scale for low to high fluid flow) as well as categories based on "flow signatures" to indicate the use of a particular device or use (e.g., toilet, shower, dishwasher, washing machine, sprinkler, etc.). Various water-using devices have a "flow signature" based on the velocity and duration of the water flow in the pipe. In one embodiment, the flow signature can be developed and refined per water-using device per location. In another embodiment, base line flow signatures for certain devices can be estimated based on collective data. For example, a standard flow signature for a toilet can be 1.1 gallons per minute for 90 seconds or 3.25 gallons per minute for 30 seconds or similar.

Metadata 7b includes user-supplied information related to the device ID, given name, physical or relational location, demographics, aggregate (such as household) information, and information averages. The stored metadata can also be used to configure the device for optimal water flow monitoring. Benchmark data 7c, is organized to establish benchmarks as a function of time (such as flow rate during particular months, days or peak times, or as compared to households or entities with similar consumption patterns), and for forecasting usage and identifying anomalous usage in light of said benchmarks, including data and benchmarks defining water appliance usage. A device interface 8 (seen as 113 in FIGS. 1-3) is connected to the microprocessor 4.

Various statistical methods (e.g., regression, GLM, Tweedie, etc.) and analytics generally fitting the category of machine learning are used to quantify the relationship between the sound measurements and the water flow in the pipe. A Development Model includes a scoring algorithm and is created as a baseline to determine the contribution of the sound frequency measurements (e.g., decibels) to the water flow estimation as well as performance benchmarks for various predictive statistical methods. Production Models are the algorithms that are physically stored on the computer-readable storage medium of the device for by-device flow estimation. Production Models use the Development Model as a performance baseline; Production Models may employ other or additional statistical methods and include more or less frequency measurements and other independent variables such as demographics, household data, and location.

The device interface 8 includes a plurality of lights (seen as 115 of FIG. 1), including a warning light, a first status light, a second status light, a battery status indicator, and a wireless status indicator. The warning light can, for example, be configured to illuminate upon an event indicating pipe leakage. The two status lights can, for example, be configured to illuminate when there are no problems detected, such that one or both status lights are on to function a "normal" status. Alternatively, the status lights may be configured to operate independently, such that different combinations of their illuminated statuses reflect modest underperformance, or over-performance. The power or battery indicator may be configured to reflect connection to a power source or a battery charge. For example, it could be configured to stay illuminated when the battery is strong and configured to flash when the battery is weak. A wireless status indicator is also depicted. This indicator may be configured to behave in a manner reflecting wireless connection status. For example, the indicator may be configured to remain off when it does not detect a wireless network. The indicator may flash when in a pairing/connecting mode. The indicator may remain illuminated while a wireless connection is maintained. A wireless transmitter 9 (data transmitter 121 of FIGS. 1-3) is connected to the microprocessor 4 and microphone 1 device to receive or transmit the data 7a, 7b, 7c to an internet-connected base station 13. In one embodiment, the metadata comes from the user portal.

The base station may be a proprietary wireless receiver, or it may be a generic wireless router. The base station 13 is capable of receiving and transmitting scheduled transmissions 12 from a plurality of flow measuring devices 14. The base station then transmits the data 7a, 7b, 7c to a remote server running a server-side application 20 via the internet 15. The separate data streams 7a, 7b, 7c are combined into a single data stream 16 for receipt by the remote server infrastructure 20 and use by the server-side application(s) 24.

Transmission of data may be continuous or may be periodical. For example, the transmission of data in real time may be preferable for the most accurate monitoring. However, it may also be preferable to transmit data only periodically, for example every minute, or hour, or other time period. The system for observing fluid flow may include a programmed routine where the on-device computer-readable storage media is deleted on a rolling basis, meaning that it may re-write over the oldest data to allow for ongoing observation. This poses minimal risk of creating gaps in data, because, if for example, the data is stored or re-written on a 24-hour schedule, and if the periodic transmission schedule is once per hour, then the device would have had at least 23 opportunities to transmit the data to the remove server. According to this embodiment, the device is programmed with a fault-detection routine, which will attempt to re-send data at the next scheduled transmission, if it detects that the data was not received at the prior-scheduled transmission. Having periodic, as opposed to continuous transmissions can save internet bandwidth, and minimize the overall volume of network-access attempts. Especially if the flow monitoring device is connected to the internet and/or remote server via cellular data communications links, minimizing the ongoing occupation of cellular data can save cost both to the user, and minimize its contribution to crowded networks. Employing the use of scheduled periodic transmissions can also maximize the potential for network reliability, because if a scheduled transmission is unsuccessful due to a network failure, then an appreciable amount of time passes before the next attempted transmission, which may provide sufficient time for network maintenance to be performed and allow for the subsequently scheduled transmission to be successful.

According to an embodiment, the routine for periodic transmission routine will be programmed to have an emergency override, and transmit data immediately if the flow monitoring device detects one or more predetermined thresholds, such as the detection of a plumbing failure, such as a toilet tank crack, or inoperative valve. Pursuant to this feature, the remote computer or server will immediately receive the data, and will be able to quickly notify a user immediately upon the happening of an emergency situation. By pairing the periodic transmission routine with the emergency override program, users will enjoy both the benefits of network efficiency, without having to sacrifice the instant notification of an emergency, as would be expected with a continuous-transmission routine.

The transmission of data may also be two-way, with the remote server and remote applications configured to transmit software updates to the flow monitoring device, remotely configure and calibrate the flow monitoring device, access the content of the computer readable storage media of the flow monitoring device, and generally perform remote configuration and maintenance routines on the flow monitoring device.

The server-side application(s) 24 and backend server infrastructure 20 includes a plurality of algorithms and analyses tools, including a flow prediction and improvement engine 17, a cohort development and maintenance routine 18, and a conservation analyzer 19 including benchmark development. The foregoing analytical tools work together to employ machine learning techniques which allow the server-side application to further develop more appropriate and accurate algorithms for measuring fluid flow, identifying appliance and/or fixture usage, and increasing confidence in emergency situations, including the circumstances for sending alerts. An exemplary analytical method is to identify the edges of water flow, meaning that the data is analyzed to determine a zero-flow baseline, and then analyzed to determine a full-flow ceiling. Normal operation would be expected in between the baseline and ceiling determinations. The analytical methods can be further improved by inputting baseline data associated with different building profiles, for example a building with an old pluming system may have different full-flow signatures as compared to buildings with newer plumbing systems. The analytical methods can be further improved by providing circumstance-specific algorithms. For example, an "away" or "vacation" mode may trigger the application of an algorithm with narrower tolerances for concluding a leak or rupture event has occurred, because minimal flow would be expected until the "away" or "vacation" mode is cancelled. Another circumstance-specific algorithm may be applied to filter preexisting external sound. For example, if the pipe flow monitoring device is located on a pipe in close proximity to the floor of a building, the microphone may sense the existence of muffled voices, or footsteps. Likewise, if the sound monitoring device is located on a pipe in close proximity to the outdoors, extraneous noises, such as passing cars, animals, and/or human speech may be detected by the microphone. The analytical methods provided herein may apply circumstance-specific algorithms which correlate to such extraneous sounds and filter them out when compared to known, expected, or predicted fixture flow signatures, thereby minimizing false leak-detection alerts.

The server-side application and backend infrastructure 24 further comprises a notification system 21, and programming for supporting a plurality of user interfaces in the form of a consumer user interface (UI) 22 and a utility (e.g. municipal water utility) UI 23 accessible through remote user portals, such as personal computers or mobile devices. The notification system 21 is configured to send alerts to users reflecting particular system characteristics via a plurality of communication means, such as text messages, email, social media platforms, and automated telephone dialing.

One of the plurality of user interfaces supported by the backend infrastructure and server-side application 20 is a consumer UI 22, which is accessed through digital portal, such as a webpage or mobile application. The consumer UI 22 comprises various menus, displays, and tools. The consumer UI 22 provides a means for user registration, one or more tools for configuring the user's flow monitoring system, such as setting a user's notification preferences, and displays for monitoring consumption, benchmarks, warnings and conservation recommendations. Another of the plurality of user interfaces supported by the backend infrastructure and server-side application 20 is a utility UI 22, which is accessed through digital portal, such as a webpage or mobile application. The utility UI 22 comprises various menus, displays, and tools. The utility UI 22 provides a means for user registration, one or more tools for configuring the user's flow monitoring system, such as setting a user's notification preferences, consumer cohort settings, and displays for monitoring "look-a-like" scenarios, consumption, benchmarks, water appliance usage, warnings and conservation recommendations.

Figure 5:
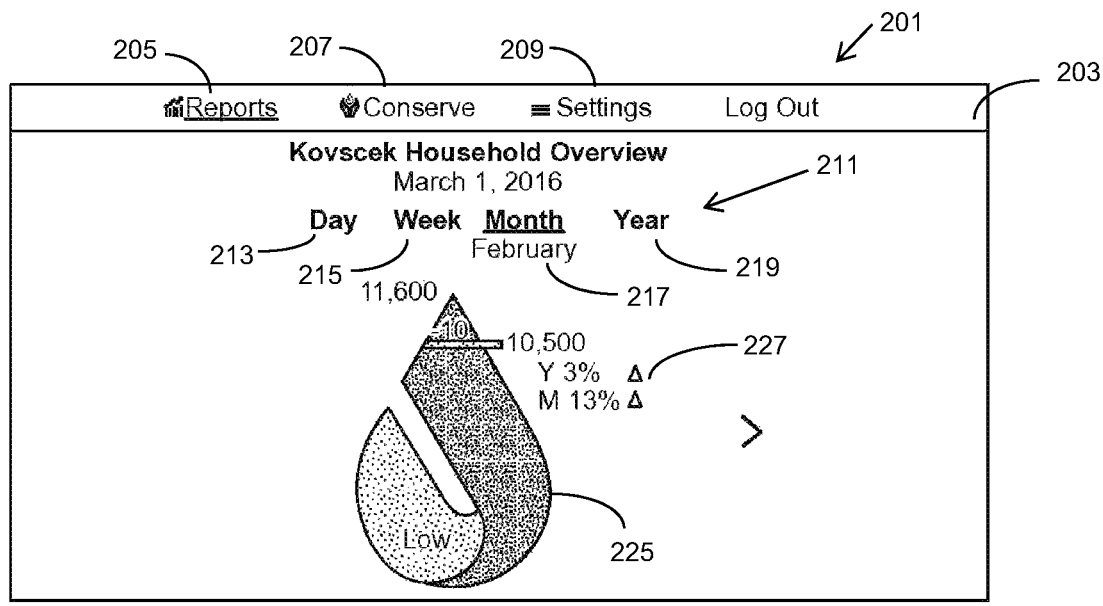
FIG. 5 is an embodiment of a user interface for a system for monitoring fluid flow of the present disclosure. The embodiment of FIG. 5 identifies an exemplary summary overview for a month's worth of data monitored by the system.

FIG. 5 is a non-limiting embodiment of a user interface 201 for a system for monitoring fluid flow of the present disclosure. FIG. 5 illustrates a summary overview for a month's worth of data monitored by the system. From the user interface 201, a user may access a main menu 203, which may further comprise a plurality menu options, such as a reports 205, conservation recommendations 207, and settings 209 menu options, among others. By accessing any particular menu option, a user may be further permitted to select various information from additional sub-menu options available and categorized according to each main-menu option. For example, illustrated in FIG. 5 within the reports menu option 205, the user interface 201 provides an option for viewing a total household overview according to a plurality of sub-menu options 211, including daily 213, weekly 215, monthly 217, and yearly 219 data selection options. In this respect, the user interface 201 permits a user to access data after it has been categorized by the backend infrastructure and server-side applications.

As disclosed in FIG. 5, for example, a user may view a summary of its monthly water use by first selecting the reports option 205 from the main menu 203, then selecting the month option 217 from the sub-menu, and thereafter choosing the particular month for which the data is desired. As seen in FIG. 5, the user has selected February for its monthly overview. Once particular data is requested by the user, the user interface 201, will display the data in an easy-to read format, such as through written text 221, a data table, or optionally with a graphical representation 225 of the user's data. FIG. 5 shows, for example, a non-limiting graphical representation of monthly water flow for February in the shape of a water droplet graphic, with a line lying horizontally across the water droplet, which is correlated to elevated or decreased use. Within each report, comparative data may be further presented. For example, in FIG. 5, the monthly overview data for February is provided in text 221 and with a graphical representation 225, but further includes comparative analytics 227, which, in this embodiment, show that February's water use was 13% higher as compared to the prior month, and 3% higher than the February of the year prior.

Figure 6:
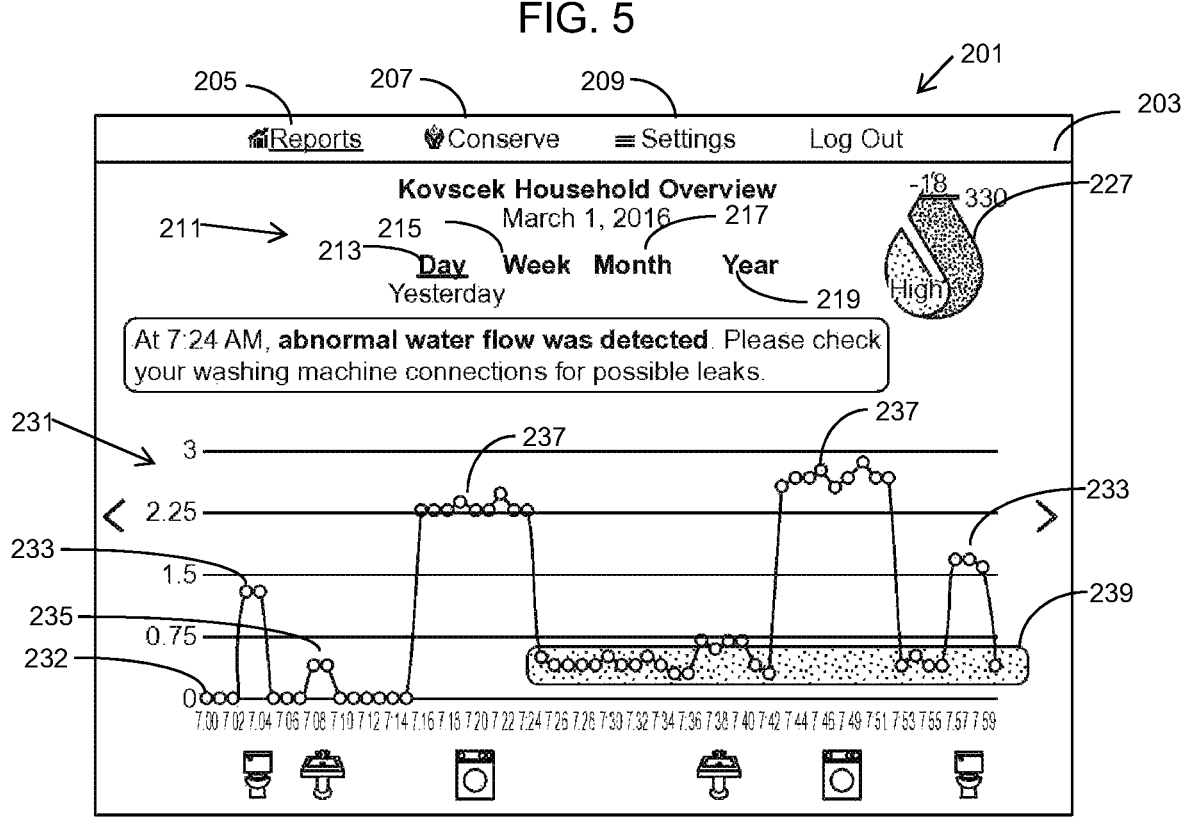
FIG. 6 is an embodiment of a user interface for a system for monitoring fluid flow of the present disclosure. The embodiment of FIG. 6 identifies an exemplary line-chart reflecting daily fluid flow data over time, as monitored by the system.

FIG. 6 is a non-limiting embodiment of a user interface for a system for monitoring fluid flow of the present disclosure. The embodiment of FIG. 6 provides a graphical representation 231 of daily fluid flow over a timeline 232, as monitored by the system. Similar to the embodiment reflecting a user's ability to select a month's overview 217 from among the options and sub-options of the main menu 203 of the user interface 201 reflected in FIG. 5, the embodiment of FIG. 6 reflects a user's ability to further navigate to the daily sub-option 213, and further choose which day among many (today, yesterday, any other particular date) for which a report is desired.

Provided in the exemplary user interface 201 embodiment of FIG. 6, a prominent text alert 233 is displayed, notifying a user that abnormal water flow was detected for that day. In this embodiment, the user interface 201 also provides a graphical representation 231 of daily total fluid flow observed at different times throughout the day in the form of a line-chart 231 on a timeline 232. The graphical representation provided in FIG. 6 not only charts flow volume as a function of time, but also provides a graphical representation of the fixture(s) associated with each flow event. The flow association is the result of the application scoring, categorization, and application of analytical tools through the server side application and backend infrastructure for determining a flow signature. Through the application of the methods provided herein, the user interface 201 is able to provide the user with an easy-to-understand graphical representation of flow use associated with each fixture, having been identified through the flow signature of said fixtures.

The chart provided in FIG. 6 shows that early in the morning, at approximately 7:02 am, flow increases from zero to approximately 1.4 gallons, and then quickly decreases back to no-flow. The system identifies this flow signature as a toilet flush 233, having applied the analytical methodology described herein. Shortly after the toilet was flushed, the system detected flow increasing from zero to approximately 0.5 gallons, sustained for a slightly longer period of time, and then returning back to zero flow. Having applied the analytical methodology, provided above, the system identifies this flow signature as a sink 235. Flow later increases to 2.25 gallons and remains sustained at the increased rate for approximately 10 minutes, before again decreasing rapidly at 7:24 am. Having applied the analytical methodology, the system recognizes this flow signature as the filling of a washing machine 237. However, because the water flow did not return to zero after the washing machine flow signature 237 decreased rapidly, an alert was triggered, which indicated that the washing machine was the source of the leak. Similarly throughout the remainder of the time displayed on the timeline, identification of flow is associated with further use of a sink 235, a washing machine 237, and a toilet 233. However, between each of these uses flow did not return to zero, indicating the persistence of a leak 239. Although the total flows for each of the fixtures were higher than what would be expected, the difference in flow as compared to the immediately preceding status was consistent. Thus, the analytical methods of the system concluded that the toilet 233 and sink 235 were functioning properly, but concluded that the washing machine 237 was the most likely source of the leak, because the non-zero flow event began with the expected conclusion of the washing machine flow signature 237.

Figure 7:
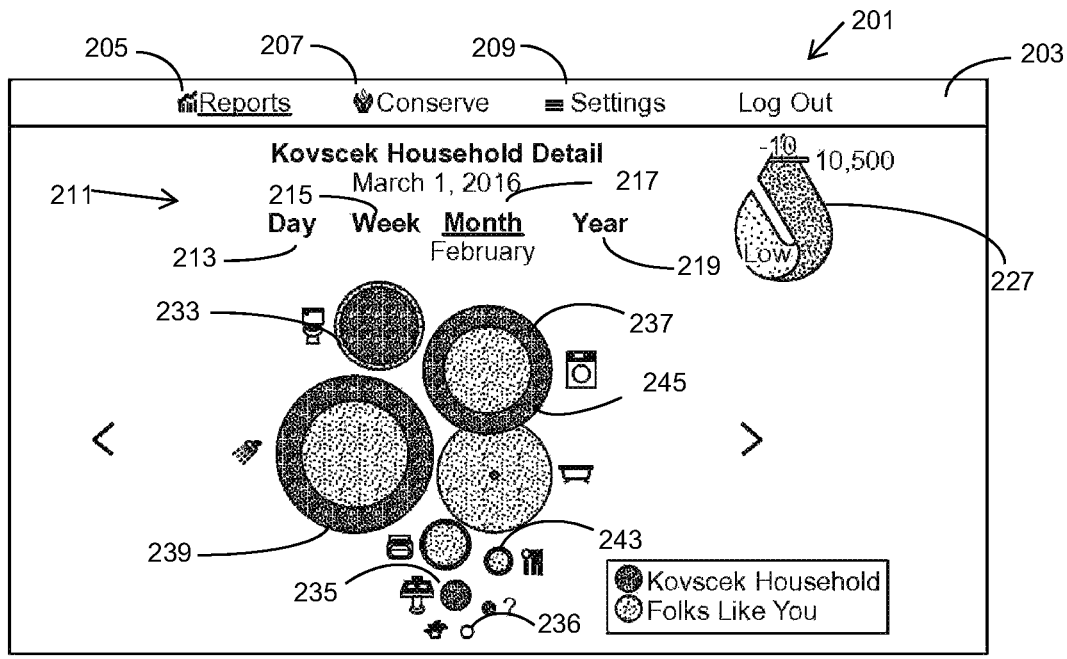
FIG. 7 is an embodiment of a user interface for a system for monitoring fluid flow of the present disclosure. The embodiment of FIG. 7 identifies an exemplary summary overview for a month's worth of data monitored by the system, categorized by figure type and graphically illustrating the amount of water used by each fixture throughout that month. The embodiment of FIG. 5 further identifies a graphical comparison layer, illustrating water use by each fixture throughout that month, comparative to other data sets.

FIG. 7 is a non-limiting embodiment of a user interface 201 for a system for monitoring fluid flow of the present disclosure. The embodiment of FIG. 7 provides a graphical representation 231 of monthly water flow, as monitored by the system, categorized by figure type. The graphical representation 231 for each fixture is scaled comparative to the other fixtures to provide a conceptual illustration of the volume of water use through each fixture. For example, in the month of February, the conceptual representation of flow measured by shower usage 239 was significantly greater than the volume of toilet use 233 as observed by the system. FIG. 7 also provides a graphical representation 231 of bathtub use 241, washing machine use 237, dishwasher use 243, sink use 235, and landscaping use 236.

The embodiment of FIG. 7 further identifies a graphical comparison 245. Although the present disclosure is not so limited, the embodiment of FIG. 7 shows a graphical comparison as being a contrasting overlaid circle for each fixture. The graphical comparison 245 provides a user a further point of reference to compare their use with water use observed in other, similar households. By way of example, the graphical representation 231 of total use and graphical comparison 245 would lead one to conclude that the user of the system of FIG. 7 uses a greater amount of volume on showers 239 as compared to similar households, but uses a significantly less amount of volume on bathtub use 243 as compared to other similar households.

Figure 8:
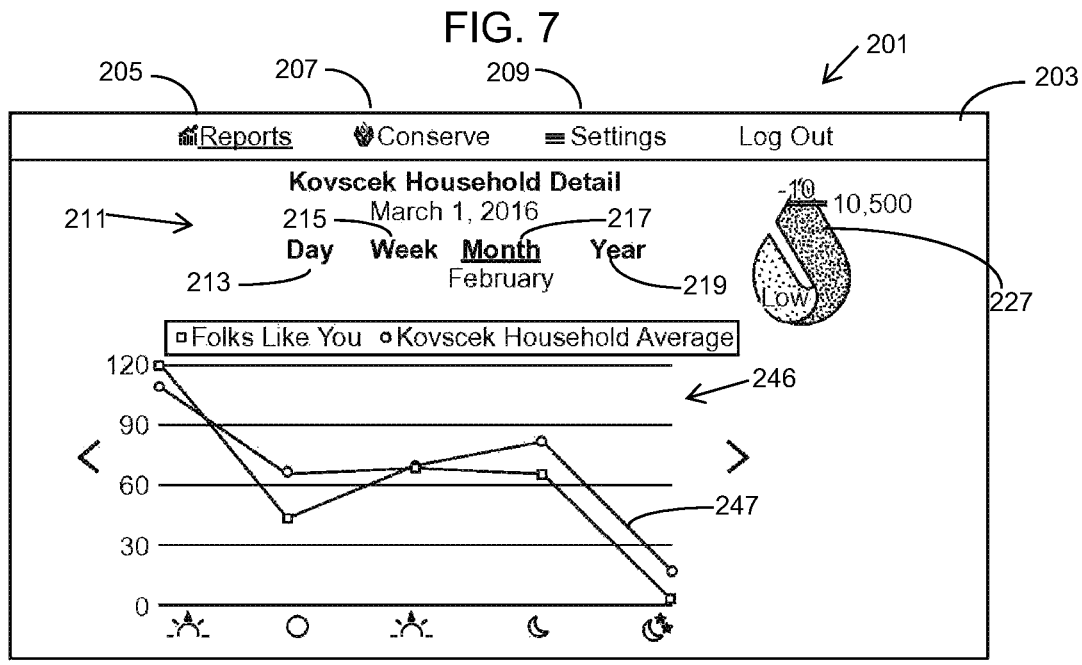
FIG. 8 is an embodiment of a user interface for a system for monitoring fluid flow of the present disclosure. The embodiment of FIG. 8 identifies an exemplary summary overview for a day's worth of data monitored by the system, categorized by volume and time of the day, graphically illustrating the amount of flow measured throughout various times of the day through a line-chart. The embodiment of FIG. 8 further reflects a graphical comparison layer of line-chart, illustrating flow volume throughout the times of the day, comparative to other data sets.

FIG. 8 is an embodiment of a user interface 201 for a system for monitoring fluid flow of the present disclosure. The embodiment of FIG. 8 identifies an exemplary summary overview for a day's worth of data monitored by the system, categorized by volume and time of the day, graphically illustrating the amount of flow measured throughout various times of the day through a line-chart 246. The embodiment of FIG. 8 further reflects a graphical comparison layer 247 line-chart, illustrating flow volume throughout the times of the day, comparative to other data sets.

Figure 9:
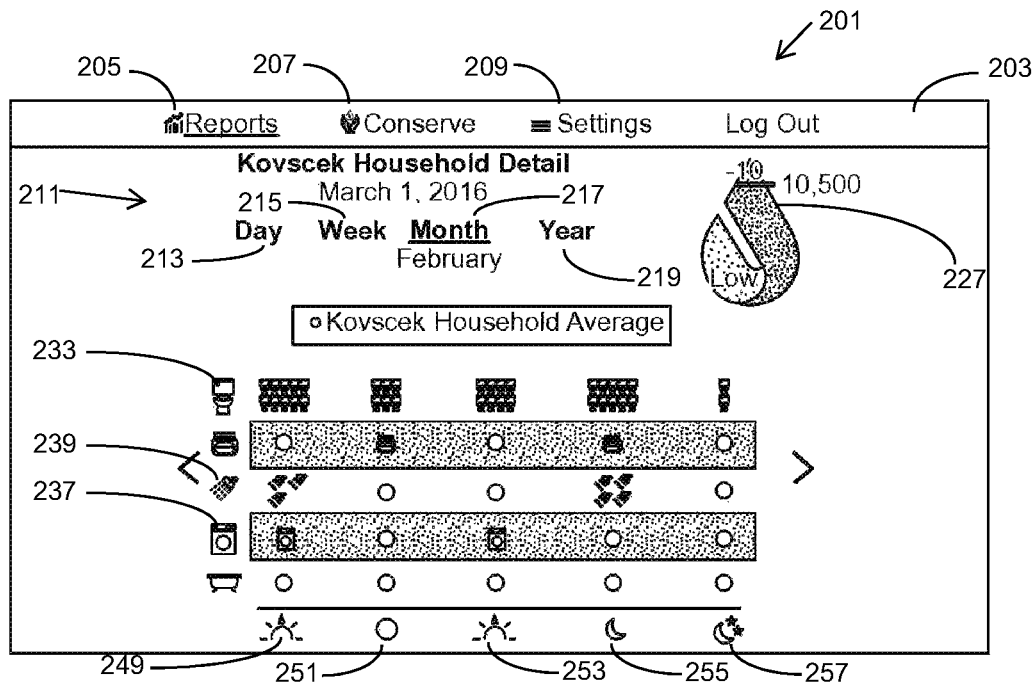
FIG. 9 is an embodiment of a user interface for a system for monitoring fluid flow of the present disclosure. The embodiment of FIG. 9 identifies an exemplary summary overview for a month's worth of data monitored by the system, categorized by fixture and volume of flow, comparative to times of the day, graphically illustrating the amount of volume used by various fixtures at times of the day.

FIG. 9 is an embodiment of a user interface 201 for a system for monitoring fluid flow of the present disclosure. The embodiment of FIG. 9 identifies a summary overview for a month's worth of data monitored by the system, categorized by fixture and volume of flow, comparative to times of the day, graphically illustrating the amount of volume used by various fixtures at times of the day.

The embodiment provided by FIG. 9 shows, for example, that toilet use 233 is heavy in the early morning 249 and evenings 255, with lighter use through the midmorning 251 and afternoon 253, and further with least use at night 257. Comparatively, the graphical representation 231 of the user interface 201 shows that washing machine use 237 in this embodiment is greatest during early morning 249 and afternoon 253. As would be expected, shower use 239 is greatest during early mornings 249 and evenings 255.

Figure 10:
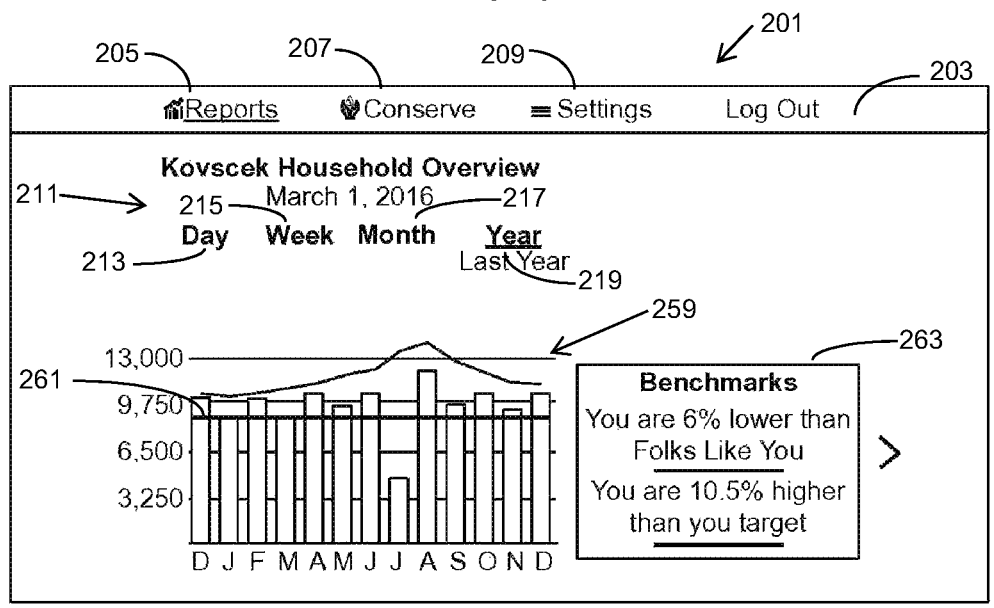
FIG. 10 is an embodiment of a user interface for a system for monitoring fluid flow of the present disclosure. The embodiment of FIG. 10 identifies an exemplary summary overview for a year of data monitored by the system.

FIG. 10 is an embodiment of a user interface 201 for a system for monitoring fluid flow of the present disclosure. The embodiment of FIG. 10 identifies an exemplary summary overview for a year of data monitored by the system. The embodiment of the user interface 201 provided in FIG. 10 shows total water volume per month in a bar chart 259. The user interface 201 may optionally allow a user to set a target usage goal 261, which may be displayed in a graphical representation, such as through a horizontal line across the bar chart. The user interface 201 may further provide a benchmark 263 comparative to a user's usage, by showing annual use by similar households relative to the user's usage on the bar chart. In the embodiment provided by FIG. 10, the benchmark 263 is a line slightly above the data provided by the bar chart, because comparative users annually use more water.

Although the embodiment for the user interface 201 provided by FIG. 10 identifies a bar chart and overlay markers to provide a graphical representation of annualized water flow, the user interface is not limited to such representations, and other graphical representations may also be used.

Figures 11, 12:
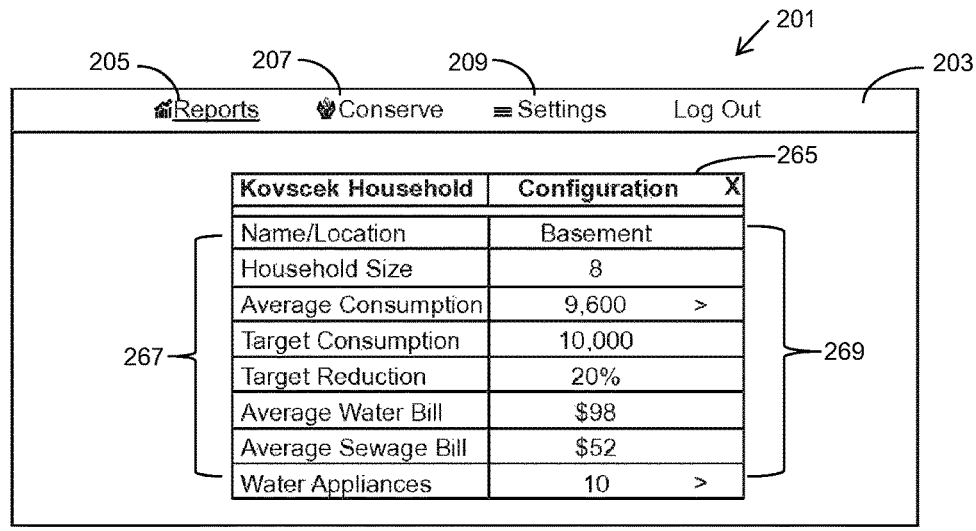
FIG. 11 is an embodiment of a user interface for a system for monitoring fluid flow of the present disclosure. The embodiment of FIG. 11 identifies an exemplary configuration page for managing user-input settings governing the system.
FIG. 12 is a non-limiting example of an illustration of a statistical analysis performed on data collected by an acoustic flow rate observation device.

FIG. 11 is an embodiment of a user interface for a system for monitoring fluid flow of the present disclosure. The embodiment of FIG. 11 identifies an exemplary configuration page 265 for managing user-input settings governing the system. The configuration page 265 provides a table with several variables 267 corresponding to different values 269 which can be modified by the user to allow the system to better calibrate its monitoring criteria, and to better apply the algorithms and analytics for providing reports and alerts. For example, the configuration page 265 may allow a user to specify the particular location of a flow monitoring device, such as in the basement, or it may allow a user to input the user's traditional utility bills for water and sewage. From this configuration data, the system will be able to better apply the analytical methods described herein to the data collected by the flow monitoring device.

FIG. 12 is a non-limiting example of developing an algorithm to calculate water flow from the sound measurement across 27 different frequencies. The algorithm defined in this figure is the baseline development model to be used as a foundation and a performance benchmark for additional models or algorithms. In this algorithm, all 27 frequencies are analyzed for performance contribution. In one embodiment, the algorithms are device specific. In another embodiment, the algorithms are cohort specific. In another embodiment, the algorithms are use case specific. In all embodiments, numerous statistical techniques are used and models are developed to identify the best algorithms. Further, in all embodiments, the algorithms are improved over time.

In one embodiment, all frequency measurements are used in the algorithm. In another embodiment, the sound measurements for each frequency with the strongest statistical relationship to fluid flow are used in the algorithm. In one embodiment, the frequency measurements include at least one reading taken on at least 10 different frequencies. In another embodiment, frequency measurements include at least one reading taken on at least 15 or 20 or 25 or 30 or 35 or 40 or 45 or 50 different frequencies. In another embodiment, the frequency measurements include at least two or three or four or five or ten of 15 or 20 readings taken on at least 10 different frequencies.

In one embodiment, the frequencies monitored can be based on the capabilities of the sound detecting device. In one embodiment, the sound detecting device can be a tri-octave band that can generate measurements across approximately 27 different frequencies. In another embodiment, the sound detecting device can be a full octave band that can generate measurements across over 60 different frequencies.

FIG. 13 is a non-limiting example of the model outcomes for the baseline development model associated with FIG. 4. The regression statistics and analysis of variance serve as a benchmark for all embodiments.

In one embodiment, the flow monitoring system is a stand-alone system operated and maintained by an end user. In another embodiment, the flow monitoring system is a service operated and maintained by third party. In another embodiment, the flow monitoring system is a subscription or subscription-like service. In another embodiment, the flow monitoring system is a lease. In the subscription or lease service, the flow monitoring device, signal processor, microprocessor, and device interface are kept by the end user with the flow monitoring device placed on the end user's pipe. The data is transmitted to a base station and server side infrastructure and application that is held and maintained by the subscription or lease service provider.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device for observing a fluid flow rate within a pipe, comprising:
    a sound detector affixed externally to the pipe;
    a structure comprising a sound-isolating material;
    an analog-to-digital converter;
    a processor;
    and a power source;
    wherein the sound detector detects a sound in a human audible range by a fluid flowing through the pipe and converts the sound to an electrical signal and the electrical signal is transmitted to the analog-to-digital converter,
    wherein the analog-to-digital converter converts the electrical signal from an analog signal to a digital data and the digital data is transmitted to the processor,
    wherein the processor is programmed with a plurality of instructions for scoring and categorizing the digital data,
    wherein the device identifies fluid flow rate as a function of time by applying at least one algorithm to the scored and categorized data,
    wherein the at least one algorithm comprises statistical analyses derived from machine learning analytics,
    and wherein the device is capable of determining the fluid flow rate through a single observation location.

2. The device of claim 1, wherein the sound detector further comprises an acoustic-to-electric microphone.

3. The device of claim 1, wherein the device applies one or more analytical applications to the transmitted data and categorizes the data according to one or more detected flow signatures which correspond to one or more plumbing fixtures or appliances.

4. The device of claim 1, further comprising a device interface,
    wherein the device interface is an observable status indicator comprising an audible alarm or visual indicator.

5. The device of claim 1, further comprising a data transmitter.

6. The device of claim 5, wherein the data transmitter comprises a first communication link to a network and wherein the transmitter transmits the observed, scored, and categorized digital data to a remote server on the network.

7. The device of claim 6, wherein the device or the remote network server applies one or more analytical applications to the transmitted data and categorizes the data according to one or more detected flow signatures which correspond to one or more plumbing fixtures or appliances.

8. A system for remotely observing a fluid flow rate within a plumbing network, comprising:
    an externally affixed device for observing fluid flow within a pipe,
    a network-connected remote server,
    one or more server-side applications,
    and a remote device having a user interface;
    wherein the device for observing fluid flow within a pipe comprises
        a sound detector for detecting a sound in a human audible range from the pipe, a structure comprising a sound-isolating material,
a processor,
a power source, and
a wireless data transmitter,
wherein the sound detector detects the sound in the human audible range and converts the sound to an electrical signal,
wherein the electrical signal is then transmitted to an analog-to-digital converter,
wherein the analog to digital converter converts the electrical signal from an analog signal to a digital data,
wherein the sound detected by the sound detector is generated by a fluid flowing through the pipe,
wherein the processor is programmed with a plurality of instructions for scoring and categorizing the digital data,
wherein the device determines the fluid flow rate by applying at least one algorithm to the scored and categorized data,
wherein the at least one algorithm comprises statistical analyses derived from machine learning analytics,
wherein the device is capable of determining the fluid flow rate through a single observation location,
wherein the wireless transmitter comprises a first communication link to the network and wherein the wireless transmitter transmits the digital data to a remote server on the network,
wherein the remote server applies one or more machine learning analytical operations to identify one or more patterns in the digital data, and
wherein the one or more patterns in the digital data identified by the remote server are accessed by the remote device and displayed on the user interface via a second communication link.

9. The system of claim 8, wherein the device or the one or more server-side applications apply one or more machine learning analytical operations to identify one or more flow signatures which correspond to one or more plumbing fixtures or appliances.

10. The system of claim 8, wherein the wireless data transmitter of the device for observing fluid flow within a pipe is a cellular antenna.

11. The system of claim 8, wherein the remote device is a mobile device, and wherein the user interface is an application for the mobile device.

12. The system of claim 8, wherein the remote device is a computer, and wherein the user interface is an application for the computer.

13. The system of claim 8, wherein the remote server stores the data transmitted by a plurality of devices for observing fluid flow, and executes machine learning analytical operations to identify comparative differences among the plurality of devices for observing fluid flow.

14. The system of claim 13, wherein the user interface is used to display data patterns according to a plurality to categorical filters.

15. The system of claim 8, further comprising a water shutoff device which can be controlled by the network-connected remote server or the device for observing fluid flow within a pipe.

16. A method for observing a fluid flow rate within a pipe, comprising the steps of:
placing a device for observing flow on the exterior of the pipe, wherein the flow monitoring device comprises a sound detector, a structure comprising a sound-isolating material, a processor, an analog-to-digital converter, affixing the sound detector external to the pipe, a power source, and a data transmitter;
detecting a sound in a human audible range generated by the fluid flowing through the pipe by the sound detector;
converting the sound from the sound detector to an electrical signal and transmitting the electrical signal to the analog-to-digital converter;
converting the electrical signal from an analog signal to a digital data by the analog-to-digital converter and transmitting the digital data to the processor;
scoring and categorizing the digital data by the processor, wherein the device identifies the fluid flow rate as a function of time by applying at least one algorithm to the scored and categorized data,
wherein the at least one algorithm comprises statistical analyses derived from machine learning analytics, and
wherein the device is capable of determining the fluid flow rate through a single observation location;
transmitting the observed, scored, and categorized digital data to a network-connected remote server via a first communication link;
applying one or more machine learning analytical operations to identify one or more patterns in the data by one or more server-side applications hosted on the network-connected remote server;
accessing the one or more data patterns identified by the remote server through a user interface on a remote device via a second communication link.

17. The method of claim 16, further comprising a step of categorizing the one or more patterns identified in the data correlating to one or more water fixtures or appliances.

18. The method of claim 17, further comprising a step of illustrating the one or more data patterns identified correlating to one or more water fixtures or appliances on the user interface of the remote device, identifying the one or more fixtures or appliances in use.

19. The method of claim 16, further comprising a step of:
periodically repeating the foregoing steps at predetermined intervals or user controlled intervals.

20. The method of claim 16, further comprising a step of:
transmitting a shut-off command to a water shutoff device upon the identification of one or more data patterns.

* * * * *